United States Patent
Tang et al.

(10) Patent No.: US 8,441,784 B2
(45) Date of Patent: May 14, 2013

(54) HOUSING AND AN ELECTRONIC DEVICE USING THE SAME

(75) Inventors: Zi-Ming Tang, Shenzhen (CN); Fa-Guang Shi, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 244 days.

(21) Appl. No.: 12/947,997

(22) Filed: Nov. 17, 2010

(65) Prior Publication Data

US 2012/0069497 A1 Mar. 22, 2012

(30) Foreign Application Priority Data

Sep. 16, 2010 (CN) .......................... 2010 1 0283400

(51) Int. Cl.
*G06F 1/16* (2006.01)
*G02F 1/1333* (2006.01)

(52) U.S. Cl.
USPC ............ 361/679.24; 361/679.21; 361/679.26; 361/679.55; 349/58

(58) Field of Classification Search ............ 361/679.01–679.45, 679.55–679.59; 345/156, 157, 168, 345/169; 455/575.1; 349/58–60
See application file for complete search history.

(56) References Cited

U.S. PATENT DOCUMENTS

| | | | | |
|---|---|---|---|---|
| 5,419,626 A | * | 5/1995 | Crockett | 312/7.2 |
| 5,535,092 A | * | 7/1996 | Bang | 361/679.34 |
| 6,151,207 A | * | 11/2000 | Kim | 361/679.26 |
| 7,489,371 B2 | * | 2/2009 | Yamamoto et al. | 349/58 |
| 2007/0268425 A1 | * | 11/2007 | Jung | 349/58 |
| 2008/0130212 A1 | * | 6/2008 | Jeong et al. | 361/681 |
| 2009/0002924 A1 | * | 1/2009 | Nakanishi et al. | 361/679 |
| 2012/0069500 A1 | * | 3/2012 | Tang et al. | 361/679.01 |
| 2012/0154997 A1 | * | 6/2012 | Shi | 361/679.01 |

\* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A housing includes a bottom shell, a support frame and protection blocks. The support frame is fixed on the bottom shell. The protection blocks are fixed between the bottom shell and the support frame. The support frame includes reinforcement side walls and receiving portions. The receiving portions are defined in the connecting portions of the adjoining reinforcement side walls. The protection blocks are received in the corresponding receiving portions. The bottom shell includes a bottom plate and four side plates extending from a periphery of the bottom plate. The support frame resists the four side plates.

12 Claims, 5 Drawing Sheets

HOUSING AND AN ELECTRONIC DEVICE USING THE SAME

CROSS-REFERENCE TO RELATED APPLICATIONS

This application is related to two co-pending U.S. patent application Ser. Nos. 12/953,772, and 12/947,999, entitled "METAL HOUSING AND ELECTRONIC DEVICE USING THE SAME" and "METAL HOUSING AND FABRICATION METHOD THEREOF", respectfully, by Zi-Ming Tang et al. The above-identified applications have the same assignee as the instant application and are concurrently filed herewith. The disclosures of the above-identified applications are incorporated herein by reference.

BACKGROUND

1. Technical Field

The present disclosure relates to device housings and particularly, to a housing of an electronic device.

2. Description of the Related Art

An electronic device often includes a bottom shell, a support frame, and a display. The support frame is fixed on the bottom shell. The screen is fixed on the support frame. However, upon impact, the display screen and the bottom shell are easily damaged due to having insufficient structural strength at the corners of the display screen and the bottom shell.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
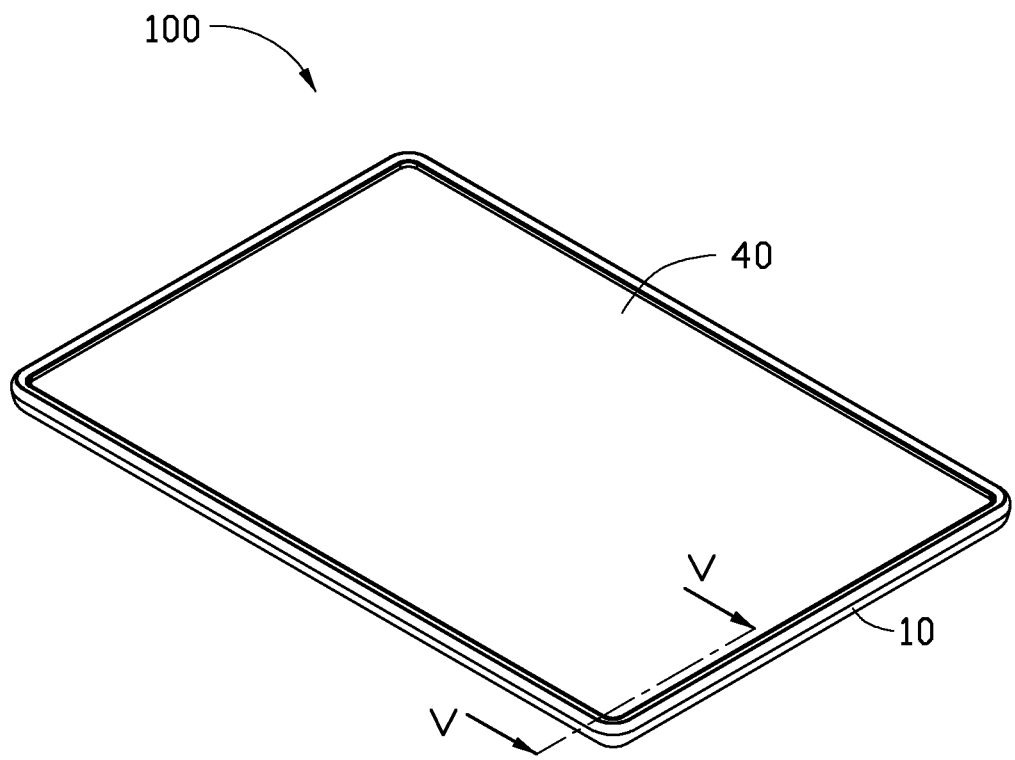
FIG. 1 is an assembled, isometric view of one embodiment of a housing for an electronic device and a display screen fixed on the housing, in which the housing includes four protection blocks.
Figure 2:
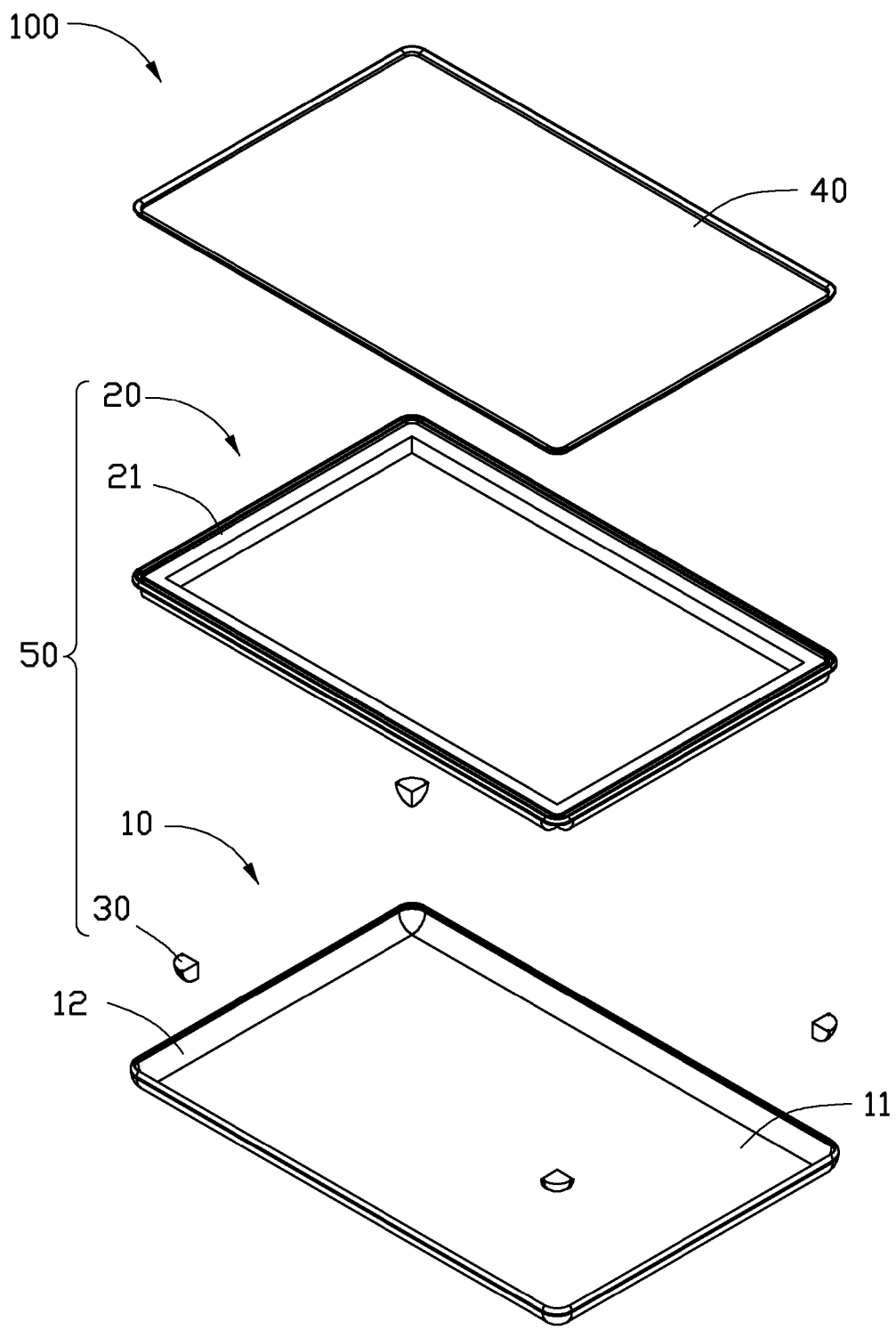
FIG. 2 is an exploded, isometric view of the electronic device shown in FIG. 1.

FIGS. 1 and 2 show one embodiment of a housing 50 for an electronic device 100 that includes a display screen 40 and other various functional modules (not shown). The other various functional modules are used to implement a variety of appropriate functions such as telephony, playing audio or other functions. The electronic device 100 can be a touch panel, a cell phone, a MP3 (Moving Picture Experts Group Audio Layer III) player, a PDA (Personal Digital Assistant), a digital photo frame or a liquid crystal display. In the illustrated embodiment, the electronic device 100 is a touch panel device. The metal housing 50 includes a bottom shell 10, a support frame 20, and four protection blocks 30. The support frame 20 is fixed in the bottom shell 10 with the protection blocks 30. The display screen 40 is fixed on the support frame 20.

The bottom shell 10 is substantially rectangular, and includes a bottom plate 11 and four side plates 12. The bottom plate 11 is substantially rectangular. The four side plates 12 extend from a periphery of the bottom plate 11. Each side plate 12 is substantially curved. A connecting portion of two adjoining side plates 12 is also substantially curved.

Figure 3:
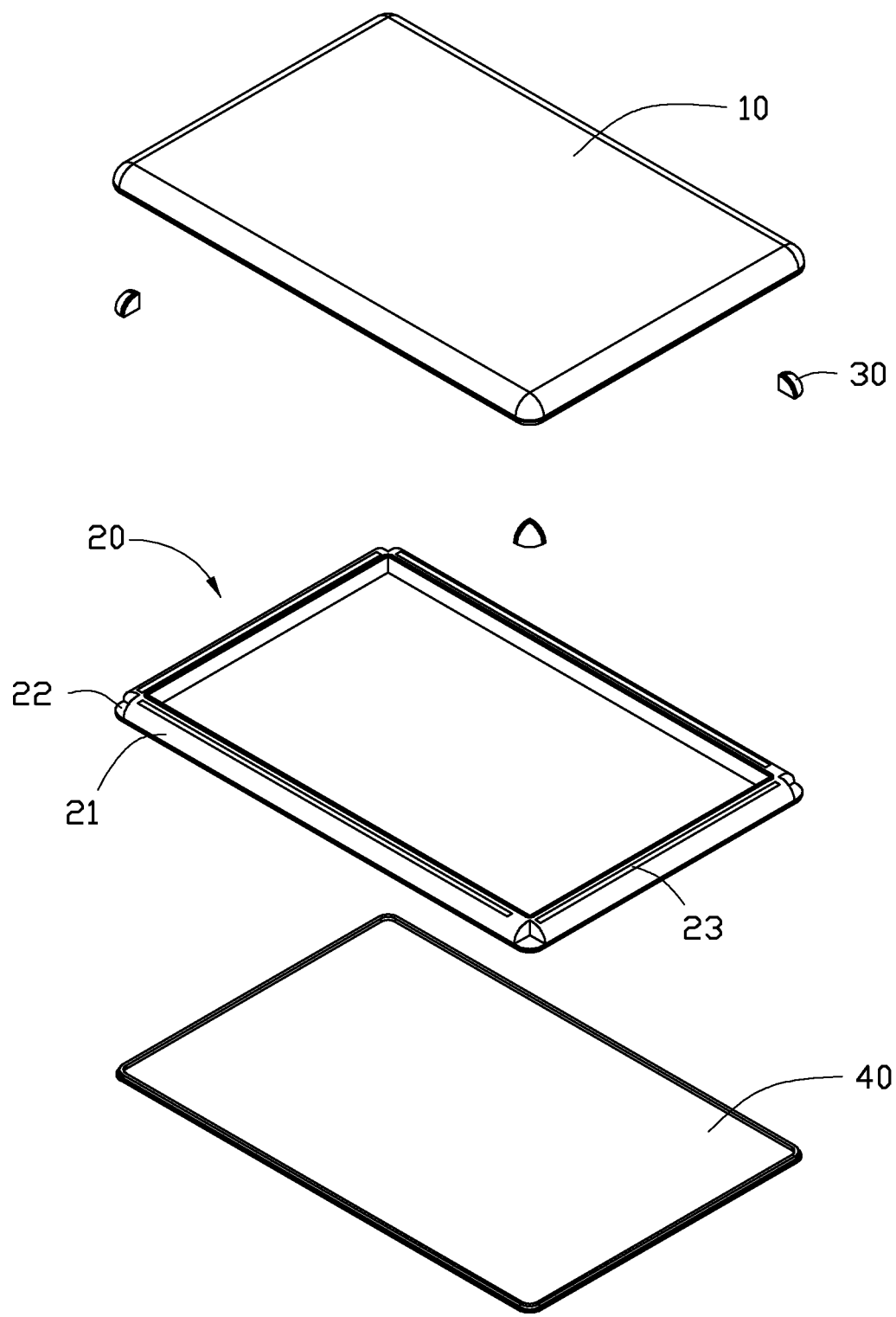
FIG. 3 is similar to FIG. 2, but viewed from another aspect.
Figure 4:
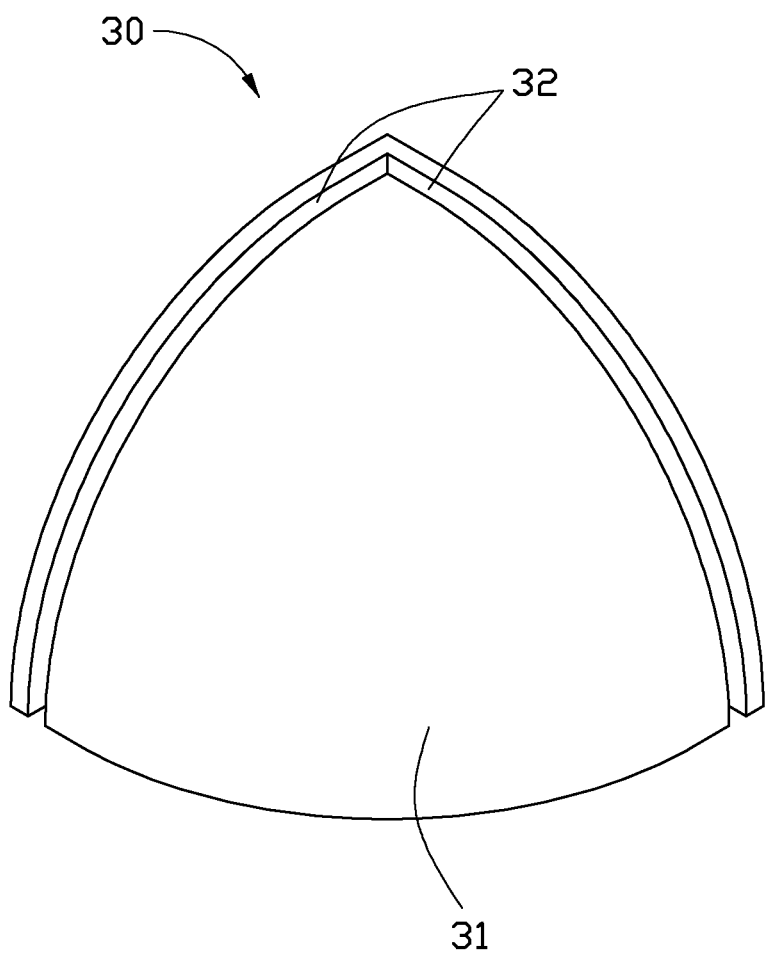
FIG. 4 is an enlarged, isometric view of one of the four protection blocks.

Referring to FIGS. 3 and 4, the support frame 20 is substantially rectangular, and includes four reinforcement side walls 21 connecting in order. The support frame 20 includes four receiving portions 22 and four elongated grooves 23. The four receiving portions 22 are defined in four corners of the support frame 20 to receive the four protection blocks 30. The elongated grooves 23 are substantially rectangular strip-shaped, and defined in the top surfaces of the four reinforcement side walls 21, respectively. Glue (not shown) is received in the elongated grooves 23, such that the support frame 20 is fixed in the bottom shell 10.

Figure 5:
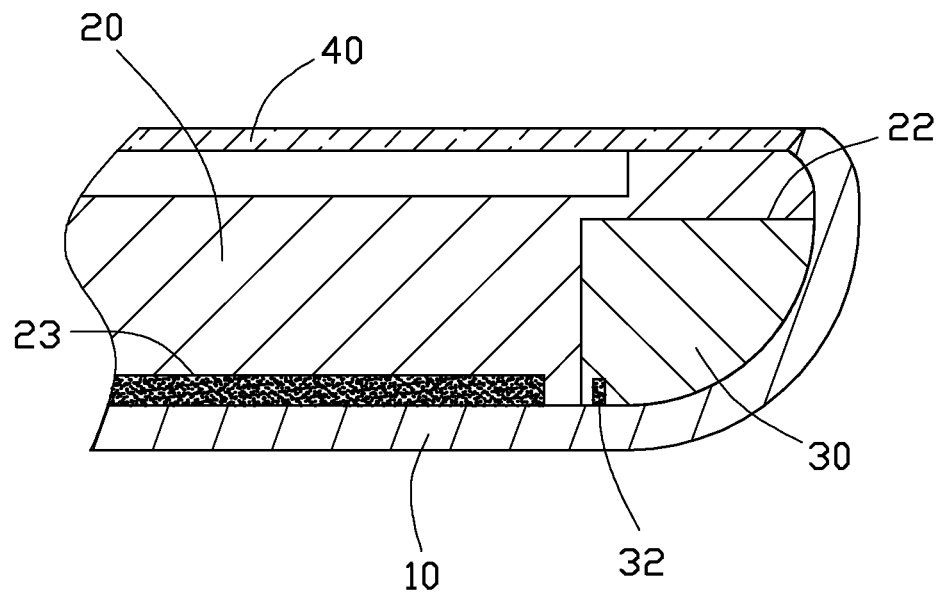
FIG. 5 is a partial cross-section of the electronic device taken along line V-V of FIG. 1.

Referring to FIG. 5, each protection block 30 is substantially pyramidal, and includes a curved surface 31 and two adhesive grooves 32. The curved surface 31 is defined in a side surface of the each protection block 30. The two adhesive grooves 32 are defined at two adjoining edges of the curved surface 31 to receive glue (not shown). Each protection block 30 is made of an alloy of hardness exceeding 50 HR, such as stainless steel or tungsten steel.

When the electronic device 100 is subjected to an external force, for example, a drop, the protection blocks 30 absorb the external force, such that the housing 50 and the display screen 40 are protected from damage by the protection blocks 30. Furthermore, the protection blocks 30 are fixed between the support frame 20 and the bottom shell 10 to save the occupied volume of the electronic device 100, such that the electronic device 100 can be more and more thinner.

It is to be understood that the side plates 12 can also extend perpendicular to the bottom plate 11. The elongated grooves 23 can also be omitted, wherein the support frame 20 is fixed to the bottom shell 10 by welding or hook structures. The adhesive grooves 32 of the protection blocks 30 can also be omitted, wherein the protection blocks 30 are fixed in the bottom shell 10 by welding.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A housing comprising: a bottom shell comprising a bottom plate and a plurality of side plates extending from a periphery of the bottom plate, wherein a connecting portion of adjoining two of the plurality of side plates is substantially curved; a support frame fixed in the bottom shell; and a plurality of protection blocks fixed between the bottom shell and the support frame, wherein the support frame comprise a plurality of reinforcement side walls and a plurality of receiving portions, the receiving portions are defined in connecting portions of the adjoining reinforcement side walls, the protection blocks are received in the corresponding receiving portions, each of the plurality of protection blocks is substantially pyramidal and comprises a curved surface, the curved surface is configured to match with and to contact with the connection portion of the adjoining two side plates, the curved surface is defined in a side surface of the each of the plurality of protection blocks, two adhesive grooves are defined at two adjoining edges of the curved surface of each of the plurality of protection blocks, and the two adhesive grooves are configured to receive glue to fix each of the plurality of protection blocks to the bottom shell.

2. The housing of claim 1, wherein the support frame resists against the plurality of side plates.

3. The housing of claim 2, wherein each of the plurality of reinforcement side walls defines an elongated groove in a top surface of each of the reinforcement side walls, the elongated groove is configured to receive glue, and the support frame is fixed in the bottom shell by the glue.

4. The housing of claim 1, wherein each of the protection blocks is made of an alloy selected from one of stainless steel and tungsten steel.

5. A housing comprising: a bottom shell comprising a bottom plate and a plurality of side plates extending from a periphery of the bottom plate, wherein a connecting portion of adjoining two of the plurality of side plates is substantially curved; a support frame fixed in the bottom shell; and a plurality of protection blocks fixed between the bottom shell and the support frame, wherein the support frame comprise a plurality of corners and a plurality of receiving portions defined in the corners to receive the protection blocks, each of the protection blocks is received in each of the receiving portions, each of the protection blocks is substantially pyramidal and comprises a curved surface configured to match with and to contact with the connection portion of the adjoining two side plates, the curved surface is defined in a side surface of the each of the plurality of protection blocks, two adhesive grooves are defined at two adjoining edges of the curved surface of each of the plurality of protection blocks, and the two adhesive grooves are configured to receive glue to fix each of the plurality of protection blocks to the bottom shell.

6. The housing of claim 5, wherein the support frame resists against the plurality of side plates.

7. The housing of claim 6, wherein the support frame defines a groove in a top surface of the support frame, the groove is configured to receive glue, and the support frame is fixed in the bottom shell by the glue. by the glue.

8. The housing of claim 5, wherein each of the protection blocks is made of an alloy selected from one of stainless steel and tungsten steel.

9. An electronic device comprising: a display screen; a bottom shell comprising a bottom plate and a plurality of side plates extending from a periphery of the bottom plate, wherein a connecting portion of adjoining two of the plurality of side plates is substantially curved; a support frame fixed in the bottom shell; and a plurality of protection blocks fixed between the bottom shell and the support frame, wherein the display screen is fixed on the support frame, the support frame comprise a plurality of reinforcement side walls and a plurality of receiving portions defined in the connecting portions of the adjoining reinforcement side walls, the protection blocks are received in the corresponding receiving portions, each of the protection blocks is substantially pyramidal and comprises a curved surface, the curved surface is configured to match with and to contact with the connection portion of the adjoining two side plates, the curved surface is defined in a side surface of the each of the plurality of protection blocks, two adhesive grooves are defined at two adjoining edges of the curved surface of each of the plurality of protection blocks, and the two adhesive grooves are configured to receive glue to fix each of the plurality of protection blocks to the bottom shell.

10. The electronic device of claim 9, wherein the support frame resists against the plurality of side plates.

11. The electronic device of claim 10, wherein each reinforcement side wall defines a groove in a top surface of each of the reinforcement side walls, the groove is configured to receive glue, and the support frame is fixed in the bottom shell by the glue.

12. The electronic device of claim 9, wherein each of the protection blocks is made of an alloy selected from one of stainless steel and tungsten steel.

* * * * *